United States Patent [19]
Friedrich et al.

[11] Patent Number: 5,504,162
[45] Date of Patent: Apr. 2, 1996

[54] SALTS OF COPOLYMERS OF ETHYLENICALLY UNSATURATED CARBOXYLIC ACIDS AND ETHYLENICALLY UNSATURATED FATTY ACID DERIVATIVES

[75] Inventors: Herbert Friedrich, Heusenstamm; Bernhard Mees, Eppstein; Richard Gruber, Waldsolms, all of Germany

[73] Assignee: Hoechst Aktiengesellschaft, Frankfurt am Main, Germany

[21] Appl. No.: 177,163

[22] Filed: Jan. 4, 1994

[30] Foreign Application Priority Data

Jan. 6, 1993 [DE] Germany ............ 43 00 140.8

[51] Int. Cl.$^6$ ............................................. C08F 8/42
[52] U.S. Cl. ................... 525/328.2; 525/328.3; 525/328.8; 525/329.2; 525/329.4; 525/329.5; 525/329.6; 525/329.9; 525/330.2; 525/367; 525/368; 525/369; 525/378; 526/240; 526/298; 526/307; 526/311; 526/318.1; 526/318.3

[58] Field of Search ................. 526/240, 318.1, 526/318.3, 298, 307, 311; 525/329.5, 328.2, 328.3, 328.8, 329.2, 329.4, 329.9, 330.2, 329.6

[56] References Cited

U.S. PATENT DOCUMENTS 3,947,399  3/1976  Sekmakas ............... 525/330.2
4,653,584  3/1987  Ball et al. ............... 526/262

*Primary Examiner*—Bernard Lipman
*Attorney, Agent, or Firm*—Connolly and Hutz

[57] ABSTRACT

Salts of copolymers of ethylenically unsaturated carboxylic acids and ethylenically unsaturated fatty acid derivatives.

6 Claims, No Drawings

SALTS OF COPOLYMERS OF ETHYLENICALLY UNSATURATED CARBOXYLIC ACIDS AND ETHYLENICALLY UNSATURATED FATTY ACID DERIVATIVES

DESCRIPTION

Salts of copolymers of ethylenically unsaturated carboxylic acids and ethylenically unsaturated fatty acid derivatives The treatment of animal skin for production of leather comprises a number of different mechanical and chemical working operations which can be divided into three groups:

1. Processes of the water workshop (soaking to tanning)
2. Wet top finishing of the leather (neutralization, retanning, dyeing and fat liquoring)
3. Top finishing of the leather (application of binder, pigment and lacquer to the already dried leather)

In rough terms, the skin consists of three layers:

1. The cuticle including hair (epidermis), which mainly comprises keratin and is removed in the lime pit.
2. The leather skin (corium), which forms the actual leather.
3. The subcutaneous connective tissue (subcutis), which is removed mechanically (for example by fleshing or splitting).

Although the tanned skin is resistant to microorganisms, it should not yet be dried, since the collagen fibers would stick together irreversibly. Only by fat liquoring are the collagen fibers enveloped such that the leather becomes soft and flexible and not horny and hard after drying.

Customary fat liquoring agents to date are based, inter alia, on sulfonated chlorinating products of fatty acids and derivatives thereof.

EP-A-136 641 relates to fat liquoring agents for leather and fur, starting from products which are obtained by sulfochlorination of prechlorinated mixtures of $C_{12}$–$C_{24}$ fatty acid triglycerides and $C_6$–$C_{20}$-fatty acid esters of monohydric alcohols or mineral oils and subsequent hydrolysis.

DE-A-34 24 902 discloses sulfonated chlorination products of higher fatty acids of chain length $C_8$ to $C_{24}$, if appropriate in the form of their salts and esters, and the use thereof in fat liquoring agents for leather or fur, it being possible for the fat liquoring agents to contain 5 to 100% by weight of sulfonated chlorinating products and the agents as a rule being employed as aqueous solutions or emulsions.

Another group of fat liquoring agents is based on oxysulfited fatty acids or derivatives thereof. EP-A-247 490 mentions fat substances which are obtained by oxysulfitation of mixtures comprising fat substances which are difficult to sulfite and have iodine numbers of less than about 100, for example sperm oil and fatty acid esters having iodine numbers of between about 60 and about 100, the weight ratio of fat substance:ester being between about 9:1 and about 1:4.

DE-A-34 37 443 describes fat liquoring agents for leather and fur in the form of aqueous emulsions which are obtained by oxysulfitation of a mixture of a fatty acid glycerol ester (iodine number >20) and a fatty acid ester, which is liquid at room temperature, of a lower aliphatic alcohol (iodine number 50–100).

Vegetable and animal oils, fats and waxes can often be emulsified to storage-stable products only with a considerable expenditure on auxiliaries. Above all, most nonionic additives to such formulations, which are not firmly anchored in the leather, can be washed out, for example, or — as in the case of mineral oils — migrate in the leather or even evaporate out of the leather by the action of heat.

There is therefore a need for an inexpensive fat-liquoring emulsifier for vegetable and animal fats, oils and waxes which is embedded permanently in the leather, does not interfere with processing and imparts no adverse properties to the finished leather. When used in small amounts and by itself, the emulsifier should be capable of emulsifying any vegetable and/or animal fat, oil and/or wax in water.

The abovementioned object is achieved by copolymers based on ethylenically unsaturated carboxylic acids and ethylenically unsaturated fatty acid derivatives according to claim 1.

In view of the prior art reported, it is to be described as extremely surprising that the copolymers according to the invention are suitable fat-liquoring sole emulsifiers for fats, oils and/or waxes, and that aqueous emulsions thereof with fats, oils and/or waxes are suitable fat liquoring agents for leather and fur pelts.

The invention relates to salts of copolymers of ethylenically unsaturated carboxylic acids and ethylenically unsaturated fatty acid derivatives comprising (A) 1–99% by weight of structural units A of the formula

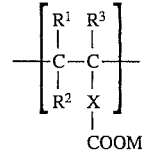

in which $R^1$ is hydrogen or $C_1$–$C_4$-alkyl, $R^2$ is hydrogen or $C_1$–$C_4$-alkyl, $R^3$ is hydrogen or $C_1$–$C_4$-alkyl, preferably methyl, X is —$(CH_2)_{0-10}$- or $C_6$–$C_{18}$-aryl, preferably phenyl, and M is an alkali metal, alkaline earth metal or ammonium ion, (B) 99–1% by weight of structural units B of the formula

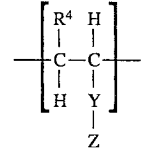

in which $R^4$ is $C_2$–$C_{16}$-alkyl or $C_2$–$C_{16}$-alkenyl,

Y is $C_1$–$C_{13}$-alkylene, —$CH_2$-$(CH=CH$-$CH_2)_{1-5}$- or —$(CH=CH)_{1-3}$- and Z is a group of the formula CN, $C(O)N(R^5)_2$, in which $R^5$ is hydrogen, $C_1$–$C_{18}$-alkyl, $C_1$–$C_{18}$-alkenyl and/or $(CH_2)_{1-3}$-OH, $COOR^6$, in which $R^6$ is $C_1$–$C_{36}$-alkyl, preferably $C_1$–$C_5$-alkyl or $C_{16}$–$C_{36}$-alkyl,

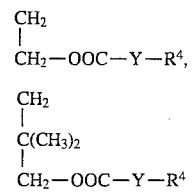

-continued

CH$_2$
|
CH—OOC—Y—R$^4$
|
CH$_2$—OOC—Y—R$^4$ or

CH$_2$—OOC—Y—R$^4$
|
CH
|
CH$_2$—OOC—Y—R$^4$ (C) 0 - 40% by weight of structural units formula C of the

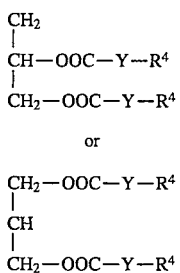

in which

R$^1$, R$^2$ and R$^3$ have the abovementioned meaning and

W is a group of the formula CN, C(O)N(R$^5$)$_2$ in which R$^5$ has the abovementioned meaning, or COOR$^7$, in which R$^7$ is C$_1$–C$_{18}$-alkyl, preferably C$_1$–C$_{10}$-alkyl and (D) 0 - 40% by weight of structural units D of the formula

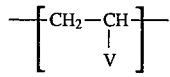

in which

V is C$_6$–C$_{18}$-aryl, preferably phenyl, or phenoxy-acetyl, C$_4$–C$_6$-lactam, preferably N-pyrrolidyl, a group of the formula O–R$^7$, in which R$^7$ is C$_1$–C$_{18}$-alkyl, preferably C$_1$–C$_{10}$-alkyl, a group of the formula (O)C-R$^7$ or a group of the formula OOC-R$^7$.

The structural units A are derived from ethylenically unsaturated carboxylic acids. Examples which may be mentioned are: acrylic acid, methacrylic acid, crotonic acid, senecioic acid, tiglic acid and/or vinylbenzoic acid.

The structural units B are derived from mono- or polyethylenically unsaturated fatty acid derivatives, preferably esters, amides or nitriles thereof.

The underlying ethylenically unsaturated fatty acids are usually mono- or polyunsaturated C$_{10}$–C$_{24}$-fatty acids, such as palmitoleic acid, oleic acid, ricinoleic acid, gadoleic acid, arachidonic acid, cetoleic acid, erucic acid, nervonic acid, linoleic acid, linolenic acid, licanic acid, parinaric acid, tetradecenoic acid, hexadecenoic acid, eicosenoic acid, octadecadienoic acid, eicosatetraenoic acid, petroselinic acid, vaccenic acid and clupanodonic acid.

The fatty acid esters are esters of mono-, di- and/or trihydric alcohols.

The monohydric alcohols include C$_1$C$_{36}$-alcohols, preferably saturated, straight-chain or branched C$_1$–C$_5$-alcohols, such as methanol, ethanol, n- and iso-propanol and n- and tert-butanol, and saturated, straight-chain C$_{16}$–C$_{36}$-alcohols, such as cetyl alcohol, n-hexacosanol, n-octacosanol, n-triacontanol, cocceryl alcohol and oleyl alcohol. These monohydric alcohols also include sterol alcohols, such as cholesterol, lanosterol and agnosterol. The dihydric alcohols include, preferably, saturated, straight-chain or branched C$_2$–C$_5$-alcohols, such as ethylene glycol and neopentyl glycol. The trihydric alcohols include, preferably, glycerol.

The term waxes is usually understood as meaning fatty acid esters with alcohols other than glycerol. The waxes which can be used according to the invention usually contain alcohols of the sterol series or higher, preferably even-numbered, aliphatic C$_{16}$–C$_{36}$-alcohols as mentioned above. Both naturally occurring and synthetic waxes are suitable comonomers. Suitable naturally occurring waxes are beeswax and the waxes of spermaceti, couch grass, wheat, rice and lucerne leaves. Synthetic waxes usually contain as fatty acids the abovementioned monounsaturated fatty acids.

The esters of fatty acids with glycerol are usually called fats or, if liquid, vegetable or animal oils. Suitable fats are both naturally occurring and synthetic fats.

The naturally occurring fats comprise almost without exception mixed glycerides containing two or even three types of fatty acid. These fatty acid constituents can be mono- or polyunsaturated and/or saturated. Suitable saturated fatty acids are, in particular, the C$_4$–C$_{24}$-fatty acids, such as butyric acid, caproic acid, isovaleric acid, capric acid, lauric acid, myristic acid, palmitic acid, stearic acid and arachic acid.

Preferred fats and oils which are glycerides of different fatty acids and which may be mentioned are: coconut oil, palm-kernel oil, palm oil, olive oil, castor oil, groundnut oil, cotton oil, soya oil, sunflower oil, colza oil, rape oil, fish oil, beef tallow, lard and whale blubber. Naturally occurring fats and oils and synthetic fats and oils which comprise only one monounsaturated fatty acid are furthermore also suitable. Babassu oil may be mentioned as a naturally occurring oil. The synthetic fats and oils comprise, as the unsaturated fatty acid, preferably oleic acid, linoleic acid, vaccenic acid, gadoleic acid, arachidonic acid, cetoleic acid, erucic acid or nervonic acid, and, as saturated fatty acids, caprylic acid, captic acid, lauric acid, myristic acid, palmitic acid or stearic acid, and mixtures of these acids. The composition of the fatty acid esters used according to the invention can be found in the relevant technical literature, such as "L. and M. Fieser, Lehrbuch der organischen Chemie (Textbook of Organic Chemistry), Verlag Weinheim GmbH, 1955" and "Dr. H. Gnamm, Die Fettstoffe des Gerbers (The Fats of the Tanner), Wiss. Verlagsgesellschaft m.b.H. Stuttgart (1943)".

The fatty acid nitriles of the formula A are nitriles of C$_4$–C$_{18}$-fatty acids. Coconut fatty acid nitrile and tallow fatty acid nitrile may be mentioned as examples.

The amines of the formula HN(R$^5$)$_2$ on which the fatty acid amides are based are primary and secondary amines in which R$^5$ has the abovementioned meaning.

Preferred amines are alkylamines, in particular C$_1$–C$_5$-dialkylamines and C$_1$–C$_3$-di-alkanolamines.

If appropriate, the copolymers according to the invention comprise structural units C which are derived from ethylenically unsaturated carboxylic acid esters, amides and/or nitriles.

Esters of acrylic acid and methacrylic acid with aliphatic C$_1$–C$_{10}$-alcohols are preferred. Preferred amides are primary and secondary C$_1$–C$_5$-alkylamides and C$_1$–C$_3$-alkanolamides of acrylic acid, methacrylic acid and crotonic acid.

The structural units D are derived from arylolefins, such as styrene, vinyllactams, such as vinylpyrrolidone, vinyl ethers, such as alkyl vinyl ethers, vinyl-N-acyl compounds, such as vinyl-N-acetamide, and vinyl esters. Alkyl vinyl ethers which can be used contain alkyl groups having a chain length of 1 to 30, preferably 4 to 28, particularly preferably 4 to 24 carbon atoms. Examples which may be mentioned are: methyl vinyl ether, ethyl vinyl ether, butyl vinyl ether, heptyl vinyl ether, decyl vinyl ether and mixtures thereof. Vinyl esters which can be used are esters of vinyl alcohol with C$_1$–C$_7$-carboxylic acids. Vinyl acetate is preferred.

The compounds on which the structural units A, B, C and D are based can be incorporated into the copolymers according to the invention as individual compounds or in the form of mixtures.

The invention also relates to a process for the preparation of copolymers based on ethylenically unsaturated carboxylic acids and fatty acid derivatives, which comprises polymerizing at least one ethylenically unsaturated carboxylic acid, as the monomer, and at least one ethylenically unsaturated fatty acid derivative, as the comonomer, with one another in the presence of a free radical donor, if appropriate in the presence of a regulator and/or a coinitiator, and then adding the aqueous solution of a base. An amount of a base equimolar to the free carboxyl groups contained in the copolymer is preferably added to the reaction mixture obtained during the polymerization. The base furthermore can be added in less than or in more than the equimolar amount, based on the free carboxyl groups.

The copolymers according to the invention are prepared by known discontinuous and continuous polymerization processes, such as bulk or solution polymerization and initiation with the customary free radical donors, such as diacyl peroxides, for example dilauroyl peroxide and dibenzoyl peroxide; peroxydicarbonates, for example diacetyl peroxydicarbonate, dicyclohexyl peroxydicarbonate, di-2-ethylhexylene peroxydicarbonate and dimyristyl peroxydicarbonate; acyl peroxyesters, for example tert-butyl perneodecanoate, tert-butyl perpivalate, tert-butyl per-2-ethylhexanoate, tert-butyl permaleate and tert-butyl perbenzoate; perketals, for example 2,2-bis(tert-butylperoxy)butane; dialkyl peroxides, for example dicumyl peroxide, di-tert-amyl peroxide and di-tert-butyl peroxide; alkyl hydroperoxides, for example cumene hydroperoxide and tert-butyl hydroperoxide, and oxygen-free radical donors, for example 2,2'-azo-bis(isobutyronitrile),3,4-dimethyl-3,4-diphenylhexane and 2,3-dimethyl-2,3-diphenylbutane.

The initiators can be employed as individual substances or in the form of mixtures, the amount employed in general being between 0.1 and 20% by weight, preferably 0.2 and 15% by weight, based on the monomers.

The polymerization is as a rule carried out at temperatures of 50° to 200° C., preferably 100° to 180° C., the reaction expediently being carried out under pressure if olefins or solvents having boiling points below the polymerization temperature are used.

The polymerization is expediently carried out with exclusion of air, i.e. if it cannot be carried out under boiling conditions, for example under nitrogen, since oxygen delays the polymerization. The reaction can be accelerated by co-using redox coinitiators, such as benzoin, dimethylaniline, ascorbic acid and heavy metal complexes which are soluble in organic solvents, such as those of copper, cobalt, manganese, iron, nickel or chromium. The amounts usually employed are 0.1 to 2000 ppm by weight, preferably 0.1 to 1000 ppm by weight. When choosing the initiator or initiator system, it is expedient to ensure that the half-life of the initiator or initiator system at the chosen polymerization temperature is less than 2 hours.

To achieve low molecular weight copolymers, it is advantageous to carry out the polymerization in the presence of regulators. Suitable regulators are, for example, allyl alcohols, such as but-1-en-3-ol, and organic mercapto compounds, such as tert-butylmercaptan, n-octylmercaptan and n-dodecylmercaptan, which are in general employed in amounts of 0.1–10% by weight, based on the reaction mixture.

The molecular weight ($\overline{M}_w$) of the copolymers according to the invention is in general between 1000 and 10,000, preferably between 1000 and 5,000.

Apparatuses which are suitable for the polymerization are, for example, the customary stirred tanks with, for example, anchor, blade, impeller or multistage impulse counter-current stirrers and, for continuous preparation, cascades of stirred tanks, tube reactors and static mixers.

Bulk polymerization is a suitable polymerization method. In this, the ethylenically unsaturated carboxylic acids and the ethylenically unsaturated fatty acid derivatives and, if appropriate, other comonomers are polymerized in the presence of an initiator and in the absence of solvents. This process is particularly suitable for those copolymers in which the monomers employed are liquid at room temperature.

It is expedient for all the monomers to be mixed in the desired composition, and this mixture is then initially introduced into the reactor and heated to the desired polymerization temperature, while stirring, the initiator and, if appropriate, coinitiator and regulator are then metered in over a period of 5 to 15 minutes and the reaction mixture is subsequently stirred for several hours. It may be expedient here to meter in the initiator and the coinitiator separately in the form of solutions in a small amount of a suitable solvent.

In another embodiment, it is also possible for a mixture of a monomer and the regulator to be initially introduced into the reactor and heated up to the desired polymerization temperature, while stirring, and the comonomer, if appropriate other comonomers, the initiator and if appropriate the coinitiator are then added.

Solution polymerization is also suitable for preparation of the desired copolymers. This is carried out in solvents in which the monomers and the copolymers formed are soluble. All the solvents which meet this requirement and do not react with the monomers are suitable for this purpose. These are, for example, acetone, methyl ethyl ketone, ethyl acetate, ethylene glycol dimethyl ether, tetrahydrofuran, dioxane and neutral oils, such as mineral oils, white oils and process oils. In a particular embodiment of the process according to the invention, the monomers employed or aportion thereof can also function as the solvent. This applies in particular to reaction with naturally occurring fats and oils as well as $C_1$–$C_6$-alkyl esters of ethylenically unsaturated fatty acids.

Usually, the monomer mixture is initially introduced into the solvent and is brought to the desired reaction temperature while gassing with nitrogen and stirring. The initiator and, if appropriate, coinitiator and regulator are then added in the course of 5 to 15 minutes, while stirring. Thereafter, stirring of the reaction mixture is continued for several hours.

In another embodiment, one monomer is initially introduced into the solvent and heated to the desired polymerization temperature and the comonomer, if appropriate other comonomers, the initiator and if appropriate the coinitiator are then added.

After the actual copolymerization has been carried out, the resulting reaction mixture is usually cooled to a temperature below 100° C., preferably 20°–80° C., particularly preferably 20° to 40° C., and at least the equimolar amount, preferably the equimolar amount, of a base is added to the reaction mixture for "neutralization" of the free carboxyl group of the ethylenically unsaturated carboxylic acids. Bases which are employed are preferably 20–40% strength by weight aqueous solutions of alkali metal hydroxides or water-soluble nitrogen compounds, such as ammonia or $C_2$–$C_3$-alkanolamines. The pH of the aqueous solution after addition of the base is preferably between 7.0 and 7.5.

The copolymer according to the invention can be obtained without problems by evaporation of the solvent.

The invention furthermore relates to the use of the copolymers according to the invention as fat-liquoring emulsifiers for vegetable and/or animal fats, oils and/ or waxes. Aqueous emulsions of these copolymers are preferably employed for this purpose. These are usually obtained by diluting the reaction mixture with water to the desired final concentration after the copolymers have been "neutralized". The final concentration is usually between 20 and 50% by weight, based on the total weight of the emulsion. The pH of the aqueous emulsions is preferably in the range from 7.0 to 7.5. It has been found that the emulsions according to the invention can also be employed in the form of acid solutions. For this purpose, the pH of the emulsion is preferably adjusted to a value of 6.0 to 6.9 by addition of acid.

The emulsion thus obtained shows an excellent fat-liquoring action on leather and fur pelts and imparts to these a pleasant soft handle. In cases where neutral oils, such as mineral oils, white oils and process oils, are not employed as solvents for the preparation of the copolymers according to the invention, these can be added to assist the fat-liquoring action of the abovementioned aqueous emulsion. These auxiliaries can be added to the aqueous emulsion in an amount which excludes occurrence of phase separation.

The emulsions according to the invention are distinguished by a high emulsifiability in water with an excellent emulsion stability.

Preparation Examples for copolymers and fat liquoring agents (IN means iodine number)

EXAMPLE 1

120 g of fish oil (IN =121) and 25 g of methacrylic acid are heated to 130° C. under a nitrogen atmosphere. 2 g of di-tert-butyl peroxide are added dropwise at this temperature in the course of 8 minutes and the mixture is subsequently stirred at 130° C. for 2 hours. Thereafter, the reaction mixture is cooled to 80° C. and 25 g of aqueous sodium hydroxide solution (33% strength by weight) are added. The pH is in the range from 7.0 to 7.2. 216 g of desalinated water are then added and the emulsion is stirred at a temperature of 80° C. over a period of 2 hours. The resulting emulsion is stable at a temperature in the range from 5° to 50° C.

EXAMPLES 2–6

The reaction is carried out analogously to Example 1 with colza oil (IN =111), sunflower oil (IN =129), olive oil (IN =79), neat's-foot oil (IN =75) and palm oil (IN = 52).

EXAMPLE 7

72 g of methyl oleate (IN =90) and 0.45 g of 3-mercaptopropionic acid, as a regulator, are heated to 130° C. under a nitrogen atmosphere. 2 g of di-tert-butyl peroxide dissolved in 16 g of acrylic acid are added dropwise at this temperature in the course of 10 minutes and the mixture is then stirred at a temperature of 130° C. for 3 hours. Thereafter, the reaction mixture is cooled to a temperature of 80° to 90° C. and 30.3 g of aqueous sodium hydroxide solution (33% strength by weight) are added. The copolymer is isolated and analyzed by $^1$H-NMR spectroscopy ($D_2O$/ $CD_3OH$ 1:1). The analytical data show a distribution of structural units A to structural units B of 97:3.

EXAMPLES 8 and 9

The reaction is carried out analogously to Example 7 with the isopropyl ester of a fish fatty acid (IN =54) and rape oil fatty acid methyl ester (IN =97).

EXAMPLE 10

60 g of a beef tallow (IN =52) are dissolved in 60 g of a mineral oil and the solution is heated to 130° C. with 25 g of methacrylic acid under a nitrogen atmosphere. 2 g of di-tert-butyl peroxide are added dropwise at this temperature in the course of 5 minutes and the mixture is then stirred for 2 hours. Thereafter, the reaction mixture is cooled to a temperature of between 80° and 90° C., 22.5 g of aqueous sodium hydroxide solution (33% strength by weight) are added and the mixture is stirred with 275 g of desalinated water at 80° C. for 2 hours.

EXAMPLE 11

The reaction is carried out analogously to Example 10 with beeswax (IN =20).

EXAMPLE 12

120 g of palm oil (IN =52), 25 g of methacrylic acid and 7 g of isobutyl methacrylate are heated to 130° C. under a nitrogen atmosphere. 5 g of di-tert-butyl peroxide are added dropwise at this temperature in the course of 5 minutes. The mixture is subsequently stirred at a temperature of 130° to 135° C. for a further 2 hours and the solution is then cooled to 90° C. 27.3 g of aqueous sodium hydroxide solution (33% strength by. weight) are added to the reaction mixture and, after addition of 189.7 g of desalinated water, the mixture is stirred at 80° to 90° C. for a further 3 hours.

EXAMPLES 13 to 17

The reaction is carried out analogously to Example 12 with fish oil (IN =121), sunflower oil (IN =129), olive oil (IN =79), colza oil (IN =111) and neat's-foot oil (IN =75).

EXAMPLE 18

120 g of rape oil acid methyl ester (IN =97), 25 g of methacrylic acid and 7 g of n-butyl methacrylate are heated to 130° C. under a nitrogen atmosphere. 2 g of ditert-butyl peroxide are added dropwise at this temperature in the course of 5 minutes. The mixture is subsequently stirred at this temperature for a further 3 hours and then cooled to 90° C. After addition of 26.3 g of aqueous sodium hydroxide solution (33% strength by weight) and 200 g of water, the mixture is stirred at 80° to 90° C. for a further 3 hours.

EXAMPLES 19 and 20

The reaction is carried out analogously to Example 18 with methyl oleate (IN =90) and fish oil acid isopropyl ester (IN =54).

EXAMPLE 21

120 g of rape oil acid methyl ester (IN =97), 25 g of methacrylic acid, 10 g of styrene and 2 g of di-tertbutyl peroxide are heated to 150° C. under a nitrogen atmosphere and the mixture is stirred at this temperature for 2 hours. Thereafter, it is cooled to 80°–90° C., 32.7 g of sodium hydroxide solution (33% strength by weight) and 100 g of hot water (60°–70° C.) are added, the mixture is stirred at 80°–90° C. for 2 hours, a pH of 6.6 to 6.9 is established by addition of 3 g of glacial acetic acid and the mixture is diluted to the desired final concentration with 94.8 g of water.

EXAMPLE 22

120 g of methyl oleate (IN =90), 30 g of methacrylic acid, 5 g of vinylpyrrolidone and 2 g of di-tert-butyl peroxide are heated to 150° C. under a nitrogen atmosphere and the mixture is stirred at this temperature for 3 hours. Thereafter, it is cooled to 85°–95° C., 43.7 g of sodium hydroxide solution (33% strength by weight) and 90 g of hot water (60°–70° C.) are added, the mixture is stirred at 80°–90° C. for 2 hours, a pH of 6.5 is established by addition of 4.3 g of glacial acetic acid and the mixture is diluted to the desired final concentration with 92.5 g of water.

EXAMPLE 23

60 g of methyl oleate (IN =90), 60 g of palm oil (IN = 52), 15 g of methacrylic acid, 15 g of acrylic acid and 2 g of di-tert-butyl peroxide are heated to 160° C. under a nitrogen atmosphere and the mixture is stirred at this temperature for 3 hours. Thereafter, it is cooled to 80°–90° C., 48.5 g of sodium hydroxide solution (33% strength by weight) and 93 g of hot water (60°–70° C.) are added, the mixture is stirred at 80°–90° C. for 2 hours, a pH of 6.6 is established by addition of 7.4 g of glacial acetic acid and the mixture is diluted to the desired final concentration with 76.1 g of water.

EXAMPLE 24

40 g of neat's-foot oil (IN =75), 80 g of sunflower oil (IN =129), 10 g of acrylic acid, 20 g of methacrylic acid and 2 g of di-tert-butyl peroxide are heated to 150° C. under a nitrogen atmosphere and the mixture is stirred at this temperature for 3 hours. Thereafter, it is cooled to 80°–90° C., 48.3 g of sodiumhydroxide solution (33% strength by weight) and 90 g of hot water (60°–70° C.) are added, the mixture is stirred at 80°–90° C. for 2 hours, a pH in the range from 6.3 to 6.6 is established by addition of 8.4 g of glacial acetic acid and the mixture is diluted to the desired final concentration with 76.1 g of water.

Use Examples

Unless stated otherwise, (®) are registered trademarks of Hoechst Aktiengesellschaft.

All the data (% by weight) are based on the shaved weight of the leather.

Use Example A:
Fat liquoring of upper leathers

| Raw material: | wet-blue, sheep, shaved to 0.8–1.0 mm thickness | | |
|---|---|---|---|
| Fat liquoring agent: | Example 7 | | |
| Washing: | 400% of water | 40° C. | |
| | 0.4% of oxyethylation product (® Remolgan PM) | | 20 min |
| | Liquor drained | | |
| Washing: | 400% of water | 35° C. | 10 min |
| | Liquor drained | | |
| | 200% of water | 35° C. | |
| | 3% of aliphatic polyaldehyde (® Granofin PL) | | 20 min |
| | 4% of ® Tannesco HN (Ciba-Geigy, Switzerland) | | 40 min |
| Washing: | 400% of water | 35° C. | 10 min |
| | Liquor drained | | |
| Neutralization: | 200% of water | 35° C. | |
| | 2% of sodium formate | | 20 min |
| | 3% of fat liquoring agent | | 5 min |
| | 1% of sodium bicarbonate | | 40 min |
| | pH of the liquor: 6.1 | | |
| | Liquor drained | | |
| Washing: | 400% of water | 50° C. | 10 min |
| | Liquor drained | | |
| Dyeing 1: | 200% of water | 50° C. | |
| | 1% of oxyethylation product (® Dispersogen ASN) | | |
| | 2% of leather dyestuff (® Remaderm) | | 30 min |
| Fat liquoring I: | 6% of fat liquoring agent | | 45 min |
| | 1.5% of formic acid, 85% strength | | 20 min |
| | Liquor drained | | |
| Washing: | 400% of water | 50° C. | 10 min |
| | Liquor drained | | |
| Dyeing II: | 200% of water | 50° C. | |
| | 1.5% of leather dyestuff (® Remaderm) | | 30 min |
| Fat liquoring | 6% of fat liquoring agent | | 45 min |
| | 2% of formic acid, 85% strength | | 30 min |
| | rinsed cold, finished as customary in industry | | |

Use Example B:
Fat liquoring of upper leathers (chrome side leather)

| Raw material: | wet-blue, bovine, shaved to 1.6–1.0 mm thickness | | |
|---|---|---|---|
| Fat liquoring: | Example 1 | | |
| Washing: | 200% of water | 35° C. | 15 min |
| | Liquor drained | | |
| Neutralization: | 150% of water | 35° C. | |
| | 1.5% of sodium formate | | 20 min |
| | 0.5% of sodium bicarbonate | | 40 min |
| | pH of the liquor: 5.0 | | |
| | Liquor drained | | |
| Washing: | 300% of water | 60° C. | 10 min |
| | Liquor drained | | |
| Dyeing: | 100% of water | 60° C. | |
| | 4% of ® Solidermin (Cassella AG) | | 45 min |
| Re-tanning: | 4% of aqueous polymer solution (® Granofin M) | | 30 min |
| | 5% of quebracho retanning agent | | |
| | 5% of vegetable tanning agent (® Granofin TA) | | 60 min |
| | 2% of resin tanning agent (® Granofin MH) | | 20 min |
| | 10% fat liquoring agent | | 60 min |
| | 3% of formic acid, 85% strength | | 20 min |
| | Liquor drained | | |
| After-treatment: | 100% of water | 60° C. | |
| | 1% of cationically emulsified fat substances (® Derminol-Licker K) | | 10 min |
| | 2% ®Solidermin (Cassella AG) | | 20 min |
| | 1% formic acid, 85% strength | | 15 min |
| | briefly rinsed cold, leather on buck, further processed as customary in industry | | |

Use Example C:
Fat liquoring of upholstery leather

| Raw material: | chrome-tanned cattle skin (southern Germany), shaved to 1.0–1.2 mm thickness |
|---|---|
| Fat liquoring agent: | Example 12 |

-continued

| | | | |
|---|---|---|---|
| Washing: | 300% of water | 35° C. | 10 min |
| | Liquor drained | | |
| Neutralization: | 200% of water | 35° C. | |
| | 5% of ® Tannesco HN (Ciba-Geigy, Switzerland) | | 30 min |
| | 5% of fat liquoring agent | | 30 min |
| | 1.5% of sodium formate | | 10 min |
| | 0.5% of sodium bicarbonate | | 60 min |
| | pH of the liquor = 6.4 | | |
| | Liquor drained | | |
| Washing: | 300% of water | 50° C. | 10 min |
| | Liquor drained | | |
| Dyeing: | 200% of water | 50° C. | |
| | 4% of fatty acid/protein condensation product (® Ofna-pon AS) | | 30 min |
| | 1.5% of ® Solidermin (Cassella AG) | | 60 min |
| Fat liquoring: | 7% of fat liquoring agent | | 45 min |
| | 1.5% of formic acid 85% strength rinsed cold, leather on buck, further processed as customary in industry | | 20 min |

Use Example D:
Fat liquoring of clothing leather

| | | | |
|---|---|---|---|
| Raw material: | wet-blue, goat, shaved to 0.8 mm thickness | | |
| Fat liquoring agent: | Example 18 | | |
| Re-tanning: | 70% of water | 30° C. | |
| | 0.6% formic acid 85% strength | | 10 min |
| | 3% of zirconium tanning agent (® Tanfix SZS) | | 60 min |
| | 30% of water | 40° C. | |
| | 1% of sodium formate | | 20 min |
| | 1.2% of sodium bicarbonate | | 30 min |
| | pH of the liquor = 4.8 | | |
| | Liquor drained | | |
| Washing: | 300% of water | 40° C. | 10 min |
| | Liquor drained | | |
| Re-tanning: | 100% of water | 40° C. | |
| | 3% of poly-phenol condensation product (® Granofin FL) | | |
| | 3% of vegetable tanning agent (® Granofin TA) | | 90 min |
| | Liquor drained | | |
| Fat liquoring: | 100% of water | 50° C. | |
| | 6% of fat liquoring agent | | 60 min |
| | 0.5% of formic acid 85% strength | | 20 min |
| | Liquor drained | | |
| Washing: | 300% of water | 25° C. | 10 min |
| | on buck overnight, dried, moistened, staked, stretched, grain side shaved, buffed, weighed. | | |

All the data in % by weight from now on are based on the dry weight.

| | | | |
|---|---|---|---|
| White-washing: | 1000% of water | 40° C. | |
| | 0.2% of oxyethylation product (® Remolgan PM) | | 120 min |
| | Liquor drained | | |
| Dyeing: | 800% of water | 50° C. | |
| | 1% of ammonia, 25% strength | | 10 min |
| | 5% of ® Solidermin (Cassella AG) | | 30 min |
| Fat liquoring: | 5% of fat liquoring agent | | 60 min |
| | 2.5% of formic acid 85% strength | | 20 min |
| | Liquor drained | | |
| Washing: | 1000% of water | 30° C. | 10 min |
| | Liquor drained | | |
| | rinsed cold, dried, moistened, staked, milled, stretched. | | |

We claim:

1. A salt of a copolymer of ethylenically unsaturated carboxylic acids and ethylenically unsaturated fatty acid derivatives comprising (A) 1–99% by weight of structural units A of the formula

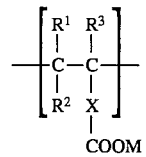

in which $R^1$ is hydrogen or $C_1$–$C_4$-alkyl, $R^2$ is hydrogen or $C_1$–$C_4$-alkyl, $R^3$ is hydrogen or $C_1$–$C_4$-alkyl, X is $-(CH_2)_{0-10}-$ or $C_6$–$C_{18}$-aryl, and M is an alkali metal, alkaline earth metal or ammonium ion, (B) 99 – 1% by weight of structural units B of the formula

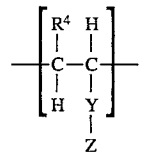

in which $R^4$ is $C_2$–$C_{16}$-alkyl or $C_2$–$C_{16}$-alkenyl,

Y is $C_1$–$C_{13}$-alkylene, $-CH_2-(CH=CH-CH_2)_{1-5}$ or $-(CH=CH)_{1-3}-$ and Z is a group of the formula CN, $C(O)N(R^5)_2$, in which $R^5$ is independently of each other hydrogen, $C_1$–$C_{18}$-alkyl, $C_1$–$C_{18}$-alkenyl or $(CH_2)_{1-3}-OH$, $COOR^6$, in which $R^6$ is $C_1$–$C_{36}$-alkyl,

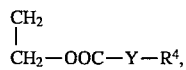

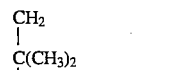

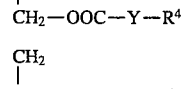

or

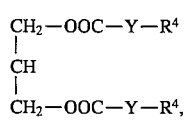

(c) 0 - 40% by weight of structural units C of the formula

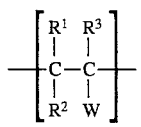

in which

R$^1$, R$^2$ and R$^3$ have the abovementioned meaning and

W is a group of the formula CN, C(O)N(R$^5$)$_2$, in which R$^5$ has the abovementioned meaning, or COOR$^7$, in which R$^7$ is C$_1$–C$_{18}$-alkyl, and (D) 0 - 40% by weight of structural units D of the formula

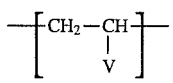

in which

V is C$_6$–C$_{18}$-aryl, phenoxyacetyl, C$_4$–C$_6$-lactam, a group of the formula O-R$^7$, in which R$^7$ is C$_1$–C$_{18}$-alkyl, a group of the formula (O)C-R$^7$ or a group of the formula OOC-R$^7$.

2. The salt of a copolymer as claimed in claim 1, in which Z is a group of the formula COOR$^6$, in which R$^6$ is C$_1$–C$_5$-alkyl or C$_{16}$–C$_{36}$-alkyl.

3. The salt of a copolymer as claimed in claim 1, in which W is a group of the formula COOR$^7$, in which R$^7$ is C$_1$–C$_{10}$-alkyl.

4. The salt of a copolymer as claimed in claim 1, in which V is a group of the formula O-R$^7$, in which R$^7$ is C$_1$–C$_{10}$-alkyl.

5. A salt of a copolymer of ethylenically unsaturated carboxylic acids and ethylenically unsaturated fatty acid derivatives consisting essentially of (A) up to 97% by weight of structural units A of the formula

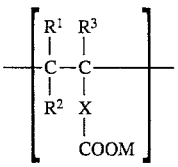

in which

R$^1$ is hydrogen or C$_1$–C$_4$ alkyl,

R$^2$ is hydrogen or C$_1$–C$_4$ alkyl,

R$^3$ is hydrogen or C$_1$–C$_4$ alkyl,

X is —(CH$_2$)$_{0-10}$ or C$_6$–C$_{18}$-aryl, and

M is an alkali metal, alkaline earth metal, or ammonium ion, (B) at least 3% by weight of structural units B of the formula

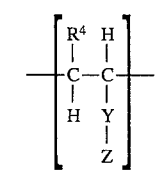

in which

R$^4$ is C$_2$–C$_{16}$-alkyl or C$_2$–C$_{16}$-alkenyl,

Y is C$_1$–C$_{13}$-alkylene, —CH$_2$—(CH=CH-CH$_2$)$_{1-5}$- or —(CH=CH)$_{1-3}$- and Z is a group of the formula CN, C(O)N(R$^5$)$_2$, in which R$^5$ is, independently of each other hydrogen, C$_1$–C$_{18}$ alkenyl or (CH$_2$)$_{1-3}$-OH, COOR$^6$ in which R$^6$ is C$_1$–C$_{36}$ alkyl,

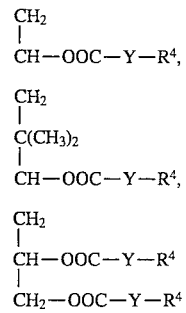

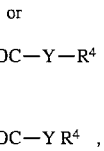

or

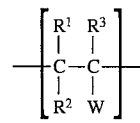

(C) up to 40% by weight of structural units of the formula

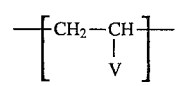

in which

R$^1$, R$^2$ and R$^3$ have the above defined meanings, and

W is a group of the formula CN, C(O)N(R$^5$)$_2$, in which R$^5$ is as defined above, or COOR$^7$, in which R$^7$ is C$_1$–C$_{18}$ alkyl, and (D) up to 40% by weight of structural units D of the formula

—[CH$_2$—CH—]—
         |
         V in which

V is C$_6$–C$_{18}$-aryl, phenoxyacetyl, C$_4$–C$_6$ lactam, a group of the formula O-R$^7$, a group of the formula (O)C-R$^7$, or a group of the formula OOC-R$^7$, in which R$^7$ is as defined above.

6. A salt of a copolymer of ethylenically unsaturated carboxylic acids and ethylenically unsaturated fatty acid derivatives consisting essentially of (A) 17% by weight of structural units A of the formula

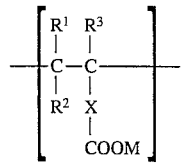

in which

R$^1$ is hydrogen,

R$^2$ is hydrogen

R$^3$ is C$_1$-alkyl,

X is —(CH$_2$)$_0$ and
M is sodium, and
(B) 83% by weight of structural units B of the formula
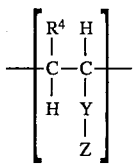
in which
R$^4$ is C$_2$–C$_{16}$-alkyl or C$_2$–C$_{16}$-alkenyl,
Y is C$_1$–C$_{13}$-alkylene
Z is a group of the formula COOR$^6$ in which R$^6$ is
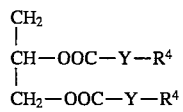
or
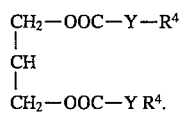
* * * * *